219-121 SR

9/6/83 OR 4,403,133

United States Patent [19]

Turner et al.

[11] 4,403,133

[45] Sep. 6, 1983

[54] METHOD OF TRIMMING A RESISTANCE ELEMENT

[75] Inventors: Bradley D. Turner, Covina; Richard E. Riley, Riverside, both of Calif.

[73] Assignee: Spectrol Electronics Corp., City of Industry, Calif.

[21] Appl. No.: 326,784

[22] Filed: Dec. 2, 1981

[51] Int. Cl.³ .............................................. B23K 27/00

[52] U.S. Cl. ................................ 219/121 LJ; 29/620; 338/195

[58] Field of Search .................. 338/195; 219/171 LJ, 219/171 LH; 29/620

[56] References Cited

U.S. PATENT DOCUMENTS

| | | | |
|---|---|---|---|
| 3,379,567 | 4/1968 | Wright | 427/195 X |
| 3,758,745 | 9/1973 | Wilker et al. | 219/121 LJ X |
| 3,947,801 | 3/1976 | Bube | 338/195 X |
| 4,032,881 | 6/1977 | Singleton | 338/195 |
| 4,146,673 | 3/1979 | Headley | 338/195 X |
| 4,159,461 | 6/1979 | Kost et al. | 338/195 |
| 4,242,152 | 12/1980 | Stone | 338/195 X |

*Primary Examiner*—C. L. Albritton
*Attorney, Agent, or Firm*—Donald F. Daley; David L. Adour

[57] ABSTRACT

A method of trimming a resistance element is disclosed which comprises cutting transversely into one side of the element until the measured total resistance of the element increases by a fraction 1/N of a fixed percentage of a desired total resistance value. The fraction 1/N is approximately equal to the path length of the resistance element divided by the designed width of the transverse cut and the fixed percentage is equal to the percent deviation of the initial total resistance of the element from a nominal, desired resistance value. After the transverse cut is made, a longitudinal-type cut is made at a distance, equal to the length of the transverse cut, from the edge of the element having the transverse cut to isolate a portion of the element from the remainder of the element so that the isolated portion has the desired total resistance. This method is particularly suitable for use with computer controlled laser trimming systems used to mass produce resistance elements.

3 Claims, 8 Drawing Figures

METHOD OF TRIMMING A RESISTANCE ELEMENT

BACKGROUND OF THE INVENTION

The present invention relates to methods of trimming electrical resistance elements and more particularly relates to methods of trimming electrical resistance elements for use in variable resistance devices such as potentiometers.

Frequently, resistance elements which are used in variable resistance devices, such as potentiometers, are manufactured to have a particular resistance value, within a given tolerance range, by depositing a thin layer or film of resistance material on a nonconductive substrate or support to form a resistance path having a resistance value less than a nominal, desired resistance value. Then, portions of the resistance material are removed (trimmed) from the resistance path until the desired resistance value is achieved. Various devices, such as abrasive or grinding apparatus, are available for removing the resistance material from the resistance path. However, when rapid trimming of a large number of resistance elements is required, it is preferable to use a computer controlled laser trimming system.

The scan, plunge, L and comb trims are known methods of trimming a resistance element which may be accomplished with a computer controlled laser trimming system. The scan trim comprises physically removing resistance material from the resistance element by making a series of incremental longitudinal laser cuts in the resistance material along the resistance path while measuring the total resistance of the resistance element. The longitudinal cuts are terminated when enough resistance material has been removed so that a desired total resistance value is achieved. The scan trim provides a resistance element which is precisely trimmed to a desired total resistance value. Also, the scan trim provides a resistance element which is suitable for use with conventional contact wipers which are used as part of variable resistance devices, such as potentiometers, and other similar devices. However, it is usually necessary to make a large number of longitudinal cuts in the resistance element to complete a scan trim. This is relatively time consuming and costly especially when it is necessary to trim large numbers of electrical resistance elements.

A plunge trim comprises making a single transverse cut into one side of a resistance element generally perpendicular to the resistance path formed by the element. The total resistance of the element is measured as the transverse cut is made and the cut is terminated when the measured total resistance increases to a desired value. If the initial total resistance of the element is much less than the desired value then the plunge trim may require making a long transverse cut which may extend almost completely across the resistance path.

A long transverse cut resulting from a plunge trim may be avoided by making a L-trim which combines the transverse cut of the plunge trim with a longitudinal cut to form a L-shaped cut in the resistance material. When making a L-trim the transverse cut is limited to a fixed maximum length. If the total resistance of the element is not equal to the desired value when the transverse cut is completed to its maximum length then a longitudinal cut is made to complete the trim. The longitudinal cut is terminated when the measured total resistance increases to the desired value.

The plunge trim and L-trim provide resistance elements which are precisely trimmed to desired resistance values. However, resistance elements made using the plunge trim and L-trim inherently have resistance functions with major linearity deviations. In addition, special contact wipers must be used, or modifications must be made to the resistance element, to avoid electrical and mechanical problems caused by a contact wiper riding over the cut in the resistance element.

The comb trim comprises making a series of spaced transverse cuts into one side of a resistance element to form a comb-like pattern of resistance material. The total resistance of the element is measured as each cut is made and each cut is terminated when the total measured resistance increases by a preselected, fixed amount. The number of cuts and fixed amount of resistance increase are preselected so that when all the cuts are made the total resistance of the element equals a desired resistance value. A comb trim usually requires a relatively long time to complete since a large number of transverse cuts usually are required to accurately trim an element to a desired resistance value within typical tolerance ranges. In addition, the comb trim, like the plunge trim and L-trim, requies that special measures be taken to avoid electrical and mechanical problems caused by a contact wiper riding over the cuts in the resistance element.

SUMMARY OF THE INVENTION

Therefore, it is an object of the present invention to improve the efficiency of mass production techniques, such as computer controlled laser trimming, for electrical resistance elements used in variable resistance devices such as potentiometers.

Another object of the present invention is to increase the speed of trimming electrical resistance elements with computer controlled laser trimming systems or other similar trimming systems.

A further object of the present invention is to increase the speed of trimming electrical resistance elements without increasing the cost or complexity of the trimming process, especially when using a computer controlled laser trimming system or other similar system.

A still further object of the present invention is to provide a relatively simple, fast and easy method of trimming resistance elements for use in variable resistance devices, such as potentiometers, such that it is not necessary to take any special measures to avoid electrical and mechanical problems which may be caused by a contact wiper riding over cuts in the resistance element.

These and other objects of the present invention are attained by a method of trimming a resistance element which comprises cutting, at a specially selected position, along the resistance path formed by the element to make a longitudinal-type cut which electrically isolates a portion of the element from the remainder of the element so that the isolated portion has a desired total resistance. The special position of this longitudinal-type cut is preselected based on the termination length of a transverse cut which is made, prior to making the longitudinal-type cut, in one side of the resistance element generally perpendicular to the resistance path. The total resistance of the element is measured as the transverse cut is made and the cut is terminated when the total resistance increases by a fraction 1/N of a fixed percentage of the desired total resistance. The fraction 1/N is approximately equal to the path length of the resistance element divided by the designed width of the transverse cut. The fixed percentage is equal to the percent deviation of the initial total resistance of the element from a nominal, desired total resistance value. The longitudinal-type cut is made at a distance, equal to the length of the transverse cut, from the edge of the element having the transverse cut to isolate a portion of the element having the desired total resistance value.

A computer controlled laser trimming system is especially suitable for making the simple cuts of the previously described trimming method. A large number of resistance elements may be trimmed in a relatively short time when using such a laser system according to the principles of the present invention.

BRIEF DESCRIPTION OF THE DRAWINGS

Other objects and advantages of the present invention will be apparent from the following detailed description in conjunction with the accompanying drawings in which.

DESCRIPTION OF THE PREFERRED EMBODIMENT

Figure 1:
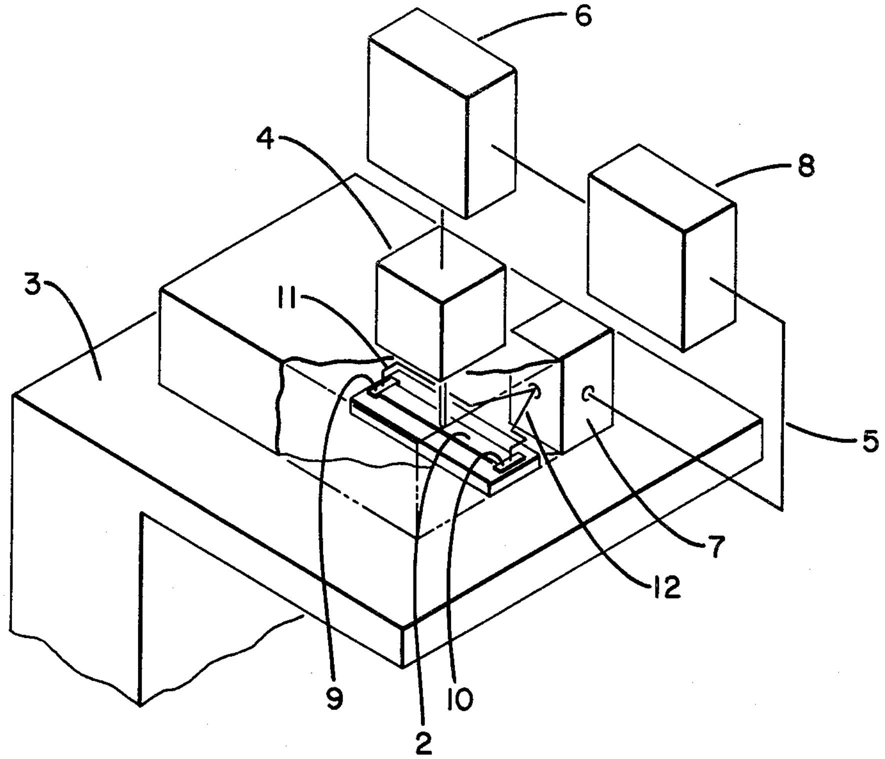
FIG. 1 depicts a computer controlled laser trimming system for trimming a resistance element according to the principles of the present invention.

Referring to FIG. 1, a computer controlled laser trimming system is shown for trimming a resistance element 2 according to the principles of the present invention. The laser trimming system comprises a laser 4 which is controlled by a computer controller 6 having as one of its inputs the output from an ohmmeter 8. The resistance element 2 has a left electrical contact 9 and a right electrical contact 10 which are connected by a first electrical lead 11 and a second electrical lead 12, respectively, to the ohmmeter 8 via connector box 7 and electrical connector 5. The ohmmeter 8 directly measures the total resistance across the element 2. Automatic handling equipment 3 is used to position the element 2 relative to the laser 4. Such a computer controlled laser trimming system is commercially available from Chicago Laser Systems in Chicago, Illinois. For example, the laser trimming system may be a Chicago Laser Systems Model CLS-33 laser resistor trimming system.

Referring to FIGS. 2 through 5, steps are illustrated for trimming a resistance element 2, with a computer controlled laser trimming system such as shown in FIG. 1 according to the principles of the present invention. First, the resistance element 2 is formed, usually from a thick film cermet material, conductive plastic, or other such material, in a specific shape. As shown in the Figures, the element 2 is rectangular but a semicircular or other such shape may be formed, if desired. The element 2 is designed to have a total resistance equal to a nominal, desired resistance value. However, because of variations in the composition of the resistance material, variations in the depth of deposit of the resistance material, and other factors, it is practically impossible to exactly achieve the desired value. Therefore, the element 2 is constructed so that the resistance of the element 2 is always less than the desired value if not equal to the desired value.

Figure 2:
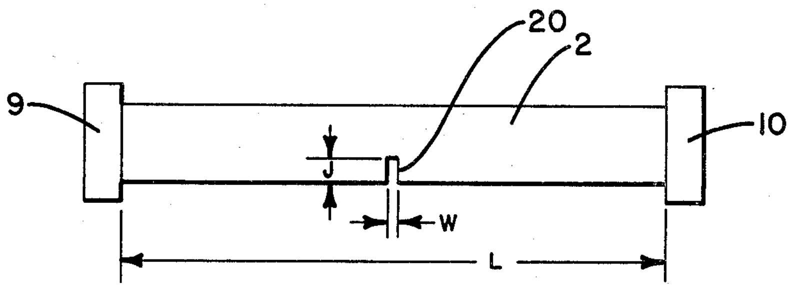
FIGS. 2 through 5 illustrate, seriatim, the steps in trimming a resistance element according to the principles of the present invention.
Figure 3:
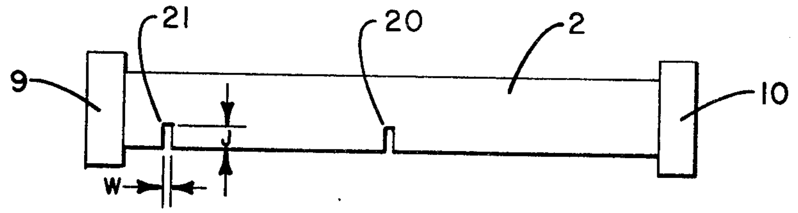

Then, as shown in FIG. 2, a first transverse cut 20 is made in one side of the element 2 approximately at the center of the element 2. The exact location of the first cut 20 is not critical. The cut 20 may be made anywhere along the resistance path away from the ends of the element 2. The total resistance across the element 2 is measured as the cut 20 is made. The cut 20 is terminated when the measured total resistance increases by an amount equal to a fraction, 1/N of a fixed percentage of the nominal, desired resistance value for the element 2. The fraction 1/N is approximately equal to the path length L of the resistance element 2 divided by the designed width W of the first transverse cut 20. The fixed percentage is equal to the percent deviation of the initial total resistance of the element 2 from the nominal, desired total resistance value. It should be noted that this resistance increase factor is equivalent to the factor used when performing a comb trim with a large number, N, of transverse cuts. Also, it should be noted that the number N, need not exactly equal the length L divided by the width W depending on the precision with which it is desired to trim the element 2. The number N usually is selected to approximately equal L/W or is on the order of L/W.

After the first transverse cut 20 is completed, a second transverse cut 21 is made near one end of the element 2 generally perpendicular to the resistance path and generally parallel to the first transverse cut 20. The cut 21 is terminated at a length J equal to the length J of the first transverse cut 20. Again, depending on the precision required for the trim, the lengths of the cuts 20 and 21 need not be exactly equal but may be only approximately equal.

Figure 4:
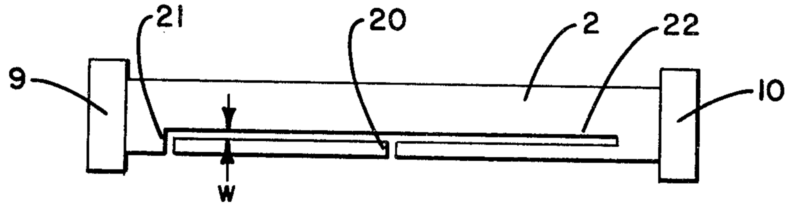
Figure 5:
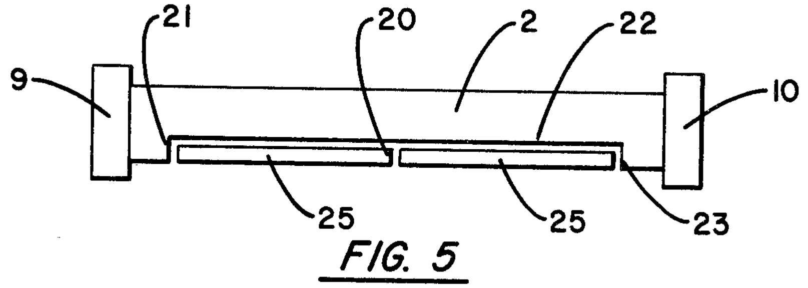

As shown in FIG. 4, after the second transverse cut 21 is completed, a longitudinal cut 22 is made along the resistance path from the end of the cut 21, through the cut 20, to the opposite end of the resistance element 2. Then, as shown in FIG. 5, a third cut 23 is made from the end of the longitudinal cut 22 to the side of the resistance element 2 having the first and second transverse cuts 20 and 21. The third transverse cut 23 is also generally perpendicular to the resistance path and generally parallel to the first and second transverse cuts 20 and 21.

As shown in FIG. 5, when the trim is completed a portion of the element 2 is physically isolated from portions 25 of the resistance element 2. The total resistance of the isolated portion of the element 2 approximately equals the nominal, desired resistance value. Since there are no cuts in this isolated portion no special measures need be taken if a contact wiper is to slide over this portion of the element 2. It has been found that a cermet resistance element, having a length on the order of 200 mils, can be trimmed, with laser cuts on the order of 2 to 4 mils in width, to within ±2% of a 500K nominal, desired resistance value, when the initial percent deviation of the element 2 from the desired resistance value is on the order of 30% and when the number N is set at 50.

Figure 6:
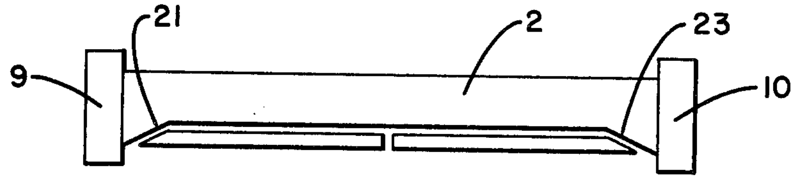
FIGS. 6 and 7 show examples of alternative trim patterns for a resistance element trimmed according to the principles of the present invention.
Figure 7:
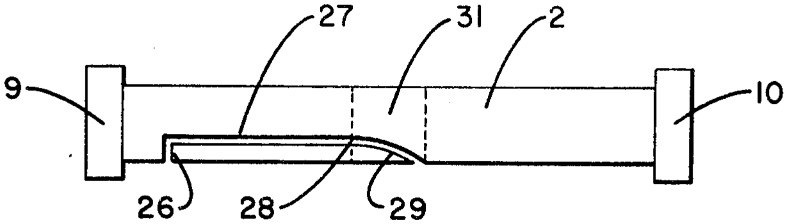

FIGS. 6 and 7 show examples of alternative trim patterns for a resistance element 2 trimmed according to the principles of the present invention. FIG. 6 illustrates a trim pattern identical to the trim pattern shown in FIG. 5 except that the second and third transverse cuts 21 and 23 are made at an angle to the resistance path rather than being generally perpendicular to the resistance path. This variation is useful when it is desired to provide a smooth electrical transition for a contact wiper crossing from the electrical contacts 9 or 10 onto either end of the resistance element 2.

FIG. 7 illustrates a trim pattern which provides a nonlinear resistance function along the resistance path of the element 2. For the pattern shown in FIG. 7, a first transverse cut 26 is made near one end of the element 2 and a longitudinal cut 27 is made along the resistance path to a point 28 after which an arc 29 is cut to provide a nonlinear resistance function in an associated area 31 of the resistance element 2. It should be noted that, when using a trim pattern such as shown in FIG. 7, the pattern must be preplanned and the length of the cut 27 adjusted so that the total resistance of the element 2 equals the desired value.

Figure 8:
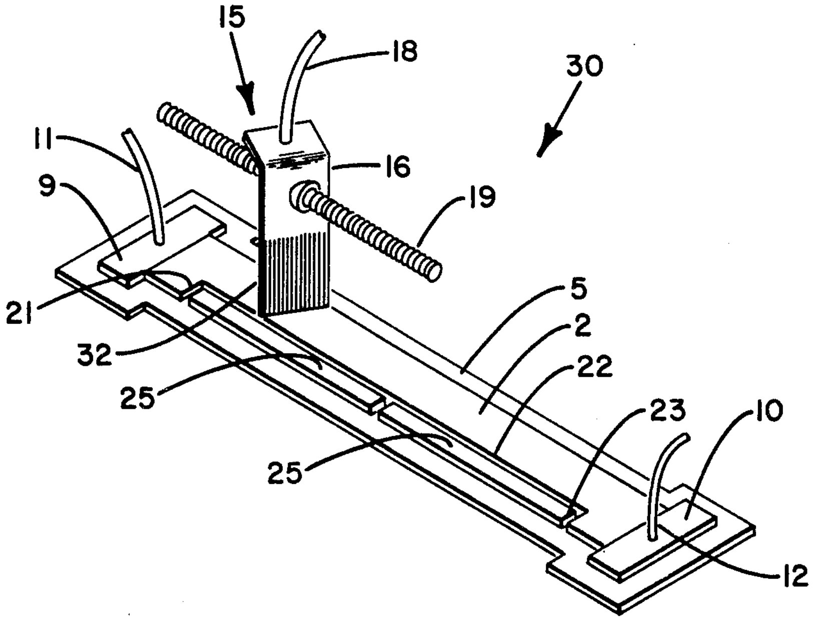
FIG. 8 is a perspective view of a potentiometer constructed with a resistance element trimmed as illustrated in FIG. 5.

FIG. 8 shows a perspective view of a potentiometer 8 having a resistance element 2 constructed as shown in FIG. 5. As shown in FIG. 8, an electrically nonconductive base 5, usually made of a ceramic material or any other such suitable nonconducting material, is used as a support member for the electrical resistance element 2. Electrical leads 11 and 12 are attached to electrical contacts 9 and 10, respectively, to provide two of the electrical leads for the potentiometer 30. A multi-fingered contact wiper 15 consisting of a series of fingers or contacts 32, block 16 and electrical connector 18 contacts the resistance element 2 only along that portion of the resistance path isolated from the portions 25 enclosed by the laser cuts 21, 22 and 23. The contact wiper 15 is attached to a housing (not shown) for the potentiometer 30 through a threaded drive shaft 19 which allows the multi-fingered contact wiper 15 to be moved along and in contact with the resistance element 2. The fingers 32 of the wiper 15 may be positioned at an angle to or perpendicular to the travel path across the resistance element 2.

The preceding description of the present invention refers to trimming a rectangular resistance element 2 used as part of a potentiometer 30. However, it should be noted that this trimming method may be used when trimming other types of resistance elements, such as curved elements, for use in many kinds of variable resistance devices. Therefore, while the present invention has been described in conjunction with particular embodiments it is to be understood that various modifications and other embodiments of the present invention may be made without departing from the scope of the invention as described herein and as claimed in the appended claims.

What is claimed is:

1. A method of trimming a resistance element which comprises:

measuring the total resistance between the ends of the resistance element to determine the percent deviation of the measured resistance from a nominal, desired resistance value;

cutting into one side of the resistance element to form a first transverse cut generally perpendicular to the resistance path formed by the element;

measuring the total resistance between the ends of the resistance element as the first transverse cut is made in the element;

terminating the first transverse cut when the measured total resistance increases by an amount which is a fraction 1/N of the percent deviation of the measured total resistance from the nominal, desired resistance, said number N approximately equal to the number obtained by dividing the width of the first transverse cut into the length of the resistance path;

cutting along the resistance path at a distance, approximately equal to the length of the first transverse cut, from the edge of the resistance element having the first transverse cut, to isolate a portion of the resistance element whereby the total resistance of the isolated portion approximately equals the nominal, desired resistance value.

2. A method of trimming a resistance element as recited in claim 1 wherein said step of cutting along the resistance element comprises:

cutting, near one end of the resistance element, into the same side of the resistance element in which the first transverse cut is located, a distance approximately equal to the length of the first transverse cut to form a second transverse cut generally parallel to the first transverse cut and generally perpendicular to the resistance path;

cutting longitudinally along the resistance element from the end of the second transverse cut through the first transverse cut to near the opposite end of the resistance element; and cutting transversely from the end of the longitudinal cut to the side of the resistance element in which the first and second transverse cuts are located to form a third transverse cut generally parallel to the first and second transverse cuts and generally perpendicular to the resistance path, to physically isolate a portion of the resistance element whereby the total resistance of the isolated portion approximately equals the nominal, desired resistance value.

3. The method as recited in claims 1 or 2 wherein the resistance element is trimmed by cutting with a computer controlled laser beam.

* * * * *